United States Patent [19]
Leenders

[11] Patent Number: 5,251,800
[45] Date of Patent: Oct. 12, 1993

[54] CAMERA HOLDER

[76] Inventor: Russell A. Leenders, 1385 Chautauqua Ave., Lincoln, Nebr. 68510

[21] Appl. No.: 966,304

[22] Filed: Oct. 26, 1992

[51] Int. Cl.$^5$ .............................................. A45F 5/00
[52] U.S. Cl. ..................................... 224/253; 224/245; 224/250; 224/270; 224/271; 224/908
[58] Field of Search ............... 224/224, 225, 226, 242, 224/245, 250, 252, 253, 270, 271, 272, 908; 352/243; 354/81, 82, 293

[56] References Cited

U.S. PATENT DOCUMENTS

| | | | |
|---|---|---|---|
| 3,452,663 | 7/1969 | Machtig | 352/243 X |
| 3,520,241 | 7/1970 | Caldwell | 352/243 X |
| 3,661,308 | 5/1972 | Walters | 224/270 X |
| 4,120,434 | 10/1978 | Hewes | 224/253 X |
| 4,714,184 | 12/1987 | Young et al. | 224/253 |
| 5,014,892 | 5/1991 | Copeland | 224/271 |

*Primary Examiner*—Renee S. Luebke
*Attorney, Agent, or Firm*—Zarley, McKee, Thomte, Voorhees & Sease

[57] ABSTRACT

A camera holder includes a support member which is removably mounted on a belt worn about a consumer's waist, and an attachment block removably connected to a support arm projecting from the support member. The attachment block has a rotatable threaded bolt projecting therefrom which may be threaded in a threaded aperture on the base of a camera to connect the camera to the attachment block. A pocket formed in the support arm removably and slidably receives the attachment block, and has a V-shaped slot formed in the forward wall. A generally V-shaped bearing projecting forwardly from the attachment block corresponds with the V-shaped slot in a wedging action to positively engage the attachment block within the pocket. An adjustable retention strap extends from the base of the support member around a camera mounted on the camera holder and is removably connected to the end of the support arm to securely retain a camera on the camera holder.

6 Claims, 3 Drawing Sheets

CAMERA HOLDER

TECHNICAL FIELD

The present invention relates generally to an apparatus for holding a camera, and more particularly to a camera holder which permits simple and unencumbered transport of a camera on a person.

BACKGROUND OF THE INVENTION

Recent efforts in the video camera industry have reduced the size and weight of video cameras in order to enable the consumer to more easily carry and utilize a video camera. Similarly, 35mm cameras have incorporated electronics which permit a reduction in size and weight for these types of cameras as well. While the reduction in size and weight has been beneficial to the consumer, transporting cameras can still be a problem. These problems reside in the specific mode of transport, which may be grouped into two major categories: (1) a carrying strap, or (2) a carrying case.

Most conventional carrying cases include a fabric or rigid container which is padded to receive the camera. The top of such cases is typically operable to allow easy access to the camera. Such cases may be transported by the use of a handle fastened to the case, or by virtue of a shoulder strap connected to the case.

While such carrying cases are convenient for transporting the camera, they do not permit quick access to the camera to take a picture or record a video. Furthermore, such cases require the consumer to occupy at least one hand and arm to transport the camera. For consumers that are hiking or require the use of both hands to carry other equipment, the carrying case is not a desirable transport method.

While conventional neck straps for cameras permit quick access to the camera to take a picture or shoot video, the weight of any camera on the neck strap may become uncomfortable in a relatively short period of time. In addition, walking or hiking with a camera on a neck strap typically requires the consumer to hold the camera so that it does not bounce against the chest in response to the movement required for hiking or the like.

It is therefore a general object of the present invention to provide an improved apparatus for holding a camera for transport.

Another object of the present invention is to provide a camera holder which leaves the hands and arms of the consumer completely free and unencumbered.

Still another object is to provide a camera holder which permits quick and simple access to the camera.

Yet another object of the present invention is to provide a camera holder which permits a consumer to carry the camera without supporting the camera around the neck or shoulders.

These and other objects of the present invention will be apparent to those skilled in the art.

SUMMARY OF THE INVENTION

The camera holder of the present invention includes a support member which is removably mounted on a belt worn about a consumer's waist, and an attachment block removably connected to a support arm projecting from the support member. The attachment block has a rotatable threaded bolt projecting therefrom which may be threaded in a threaded aperture on the base of a camera to connect the camera to the attachment block. A pocket formed in the support arm removably and slidably receives the attachment block, and has a V-shaped slot formed in the forward wall. A generally V-shaped bearing projecting forwardly from the attachment block corresponds with the V-shaped slot in a wedging action to positively engage the attachment block within the pocket. An adjustable retention strap extends from the base of the support member around a camera mounted on the camera holder and is removably connected to the end of the support arm to securely retain a camera on the camera holder.

DESCRIPTION OF THE PREFERRED EMBODIMENT

Figure 1:
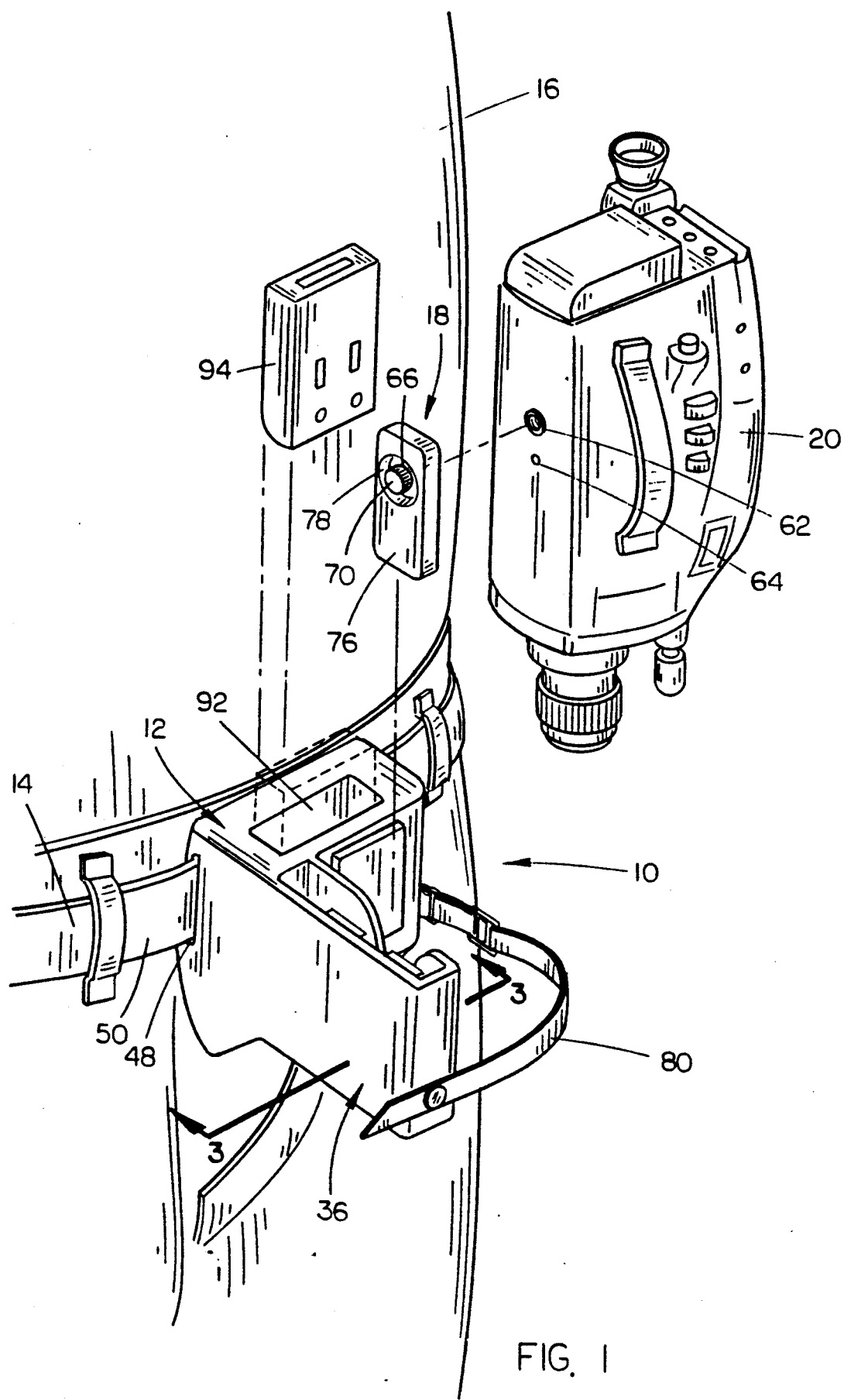
FIG. 1 is a perspective view of the camera holder of the present invention, with a camera and attachment block shown removed from the holder.

Referring now to the drawings, in which similar or corresponding parts are identified with the same reference numeral, and more particularly to FIG. 1, the camera holder of the present invention is designated generally at 10 and includes a support member 12 removably mounted on a belt 14 worn by a consumer 16, and an attachment block 18 removably mounted to a conventional camera 20. Attachment block 18 is operably slidably mounted on support member 12, as described in more detail hereinbelow, so as to permit quick and simple removal of camera 20 from the support member 12.

Figure 2:
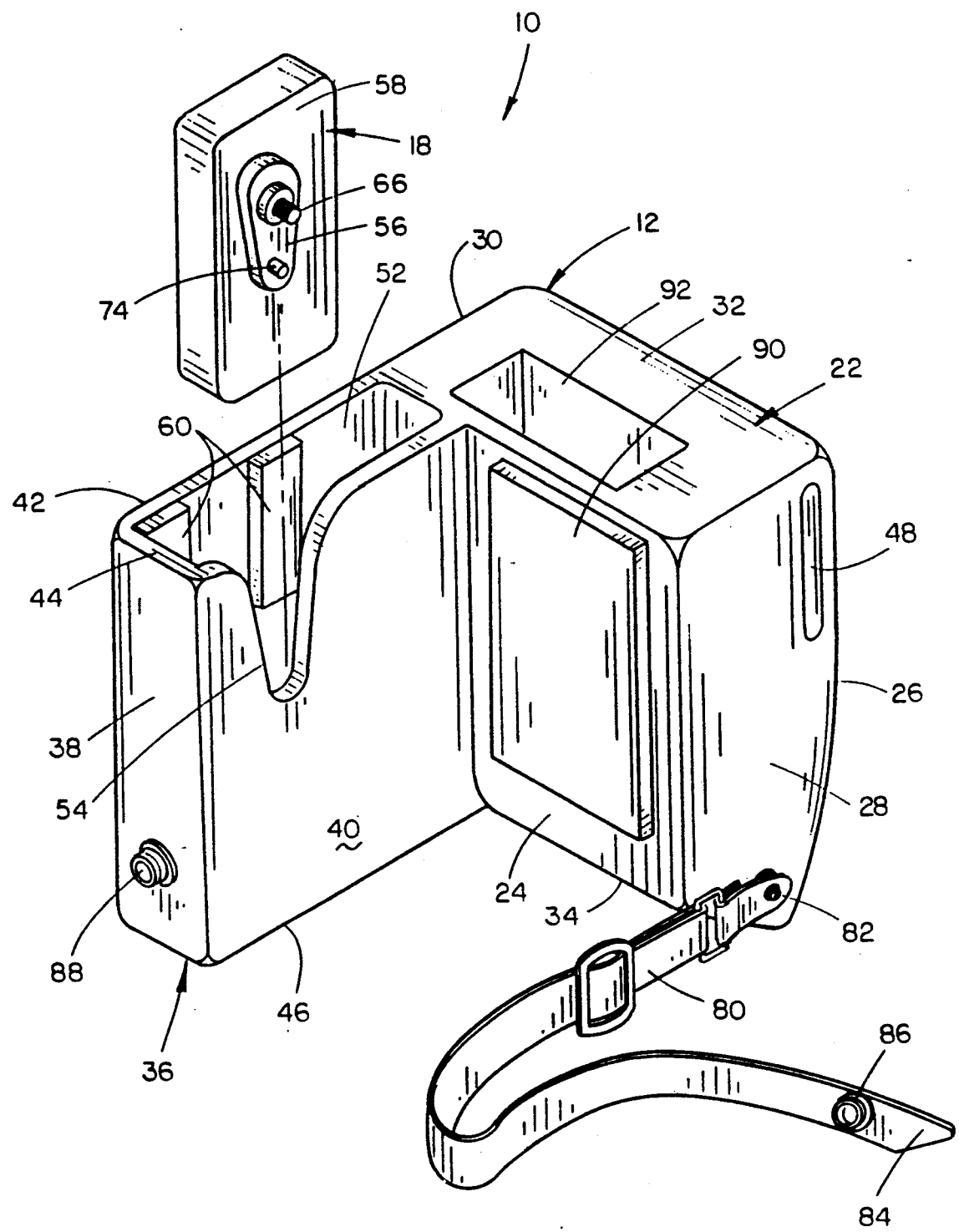
FIG. 2 is an enlarged perspective view of the invention with the attachment block removed.

Referring now to FIG. 2, support member 12 includes a base block 22 having an outward face 24, an inward face 26, a forward face 28, rearward face 30 and top and bottom ends 32 and 34 respectively. Support member 12 has a support arm 36 projecting outwardly from the rearward end of outward face 24. Support arm 36 has an outward face 38, forward and rearward walls 40 and 42 respectively, and upper and lower ends 44 and 46 respectively.

A slot 48 extends horizontally through base block 22 from forward face 28 to rearward face 30, and has dimensions so as to receive a conventional belt 50, as shown in FIG. 1. Inward face 26 of base block 22 curves slightly outwardly at its lower end, as shown in FIGS. 1 and 2, to more closely follow the body of the consumer. When the camera is connected to support arm 36, the weight of the camera is distributed over a larger surface area of inward face 26, due to the curvature of the lower end of inward face 26. The inventor has found that a flat vertical face causes the majority of the weight from a camera supported on camera holder 10 to be directed along the edge between the inward face 26 and the bottom end 34 of base block 22. The curvature along the lower end of inward face 26 has been found to avoid this problem by distributing the weight over the surface area of the curvature.

Support arm 36 has an upwardly opening pocket 52 formed therein which will removably and slidably receive attachment block 18. A generally V-shaped slot 54 is formed in forward wall 40 downwardly from the upper end 44, which will receive a correspondingly V-shaped bearing 56 mounted on a forward face 58 of attachment block 18. The V-shape of bearing 56 and slot 54 provides a wedging action to positively engage attachment block 18 within pocket 52. In order to assure a tight fit of attachment block 18 within pocket 52 between forward and rearward walls 40 and 42, a pair of strips 60 of resilient material are affixed to the interior face of rearward wall 42. Such strips could be eliminated by utilizing resilient yet rigid materials for attachment block 18 and support arm 36, with attachment block 18 having a dimension to snugly fit within pocket 52.

Figure 3:
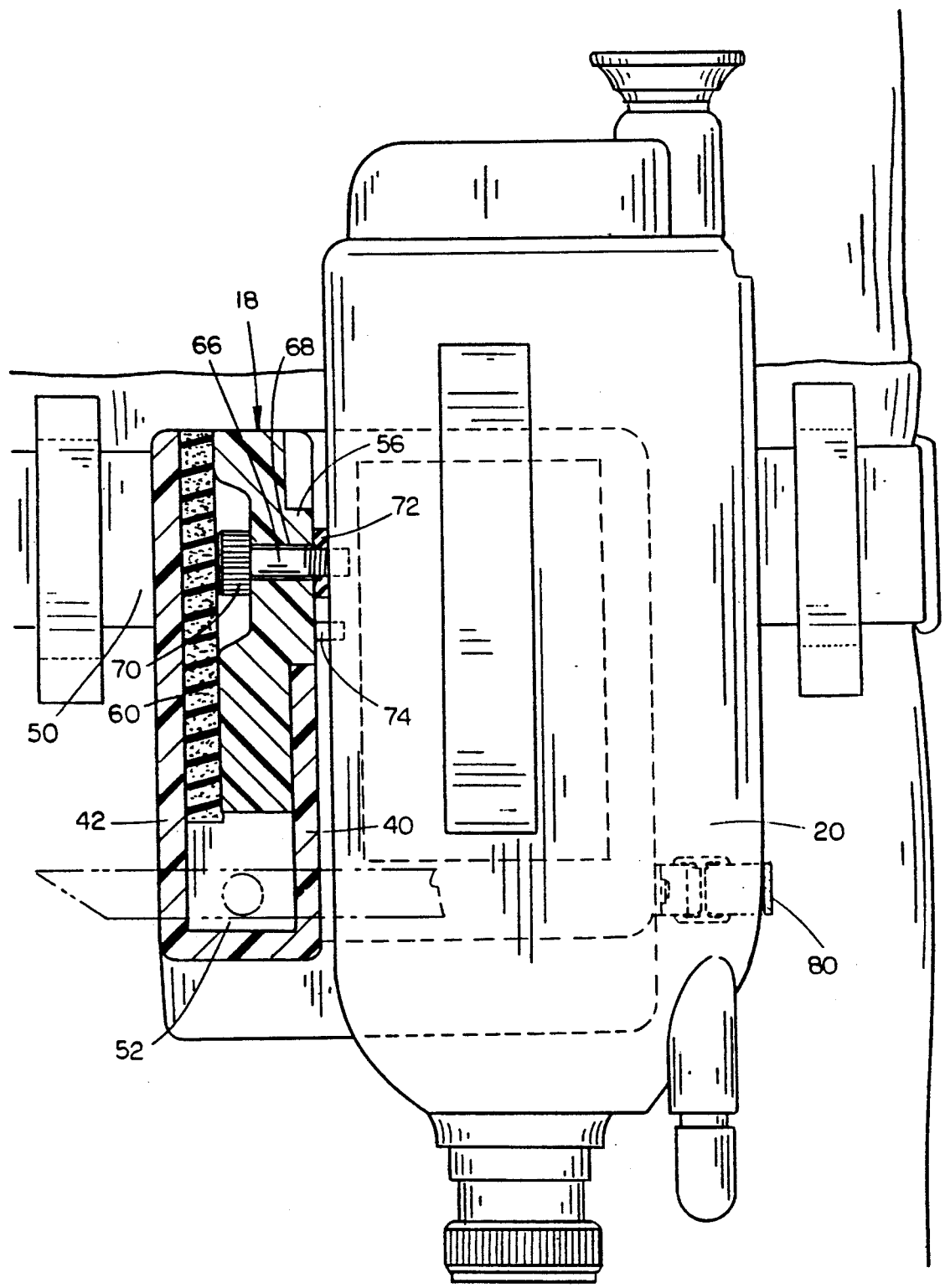
FIG. 3 is a sectional view taken at lines 3—3 in FIG. 1.

Referring to FIG. 1, video cameras and 35mm cameras typically have a threaded aperture 62 formed in the bottom surface thereof, to permit the camera to be mounted on a tripod or the like. A smaller unthreaded aperture 64 is also found on many cameras adjacent threaded aperture 62, to prevent pivotal movement of the camera about threaded aperture 62 when mounted on a tripod or the like. As best shown in FIG. 3, attachment block 18 has a threaded bolt 66 extending forwardly through an opening 68 so as to project forwardly from bearing 56. Bolt 66 has a knurled knob 70 on one end to permit finger-operated rotation of the bolt within opening 68. Bolt 66 is sized so as to correspond with threaded aperture 62 to fasten attachment block 18 to camera 20, as shown in FIG. 1. A resilient rubber washer 72 may be positioned on bolt 66 to cushion the connection between attachment block 18 and camera 20.

As shown in FIG. 2, a pin 74 is mounted on the forward surface of bearing 56 and located to correspond with aperture 64 conventionally found on camera 20. Since not all cameras have the unthreaded aperture 64 shown in FIG. 1, pin 74 may be spring loaded in an aperture in bearing 56 to permit biased retraction into the attachment block. In the alternative, an accessory attachment block 18 may be provided without pin 74, to permit attachment to cameras without aperture 64.

The rearward face 76 of attachment block 18 has a generally circular depression 78 formed therein coaxial with bolt 66 with a diameter greater than the diameter of bolt head 70, to permit bolt head 70 to be recessed flush with rearward surface 76. Depression 78 is preferably large enough to allow access to bolt head 70 to permit the consumer to rotate bolt head 70 and disconnect camera 20 from attachment block 18.

As shown in FIG. 2, a retention strap 80 is pivotally mounted at one end 82 to the forward face 28 of base block 22. The opposite end 84 of strap 80 has the first half 86 of a cooperable fastener mounted thereon for selective connection to the corresponding half 88 of the cooperable fastener mounted on the outward face of support arm 36. As shown in FIGS. 1 and 3, strap 80 is utilized to assist in retaining camera 20 on camera holder 10, and prevent undesirable movement relative to the camera holder. Strap 80 is preferably length adjustable to permit secure retention of cameras of various sizes.

A resilient soft pad 90 is mounted to the outward face 24 of base block 22 to cushion the side of a camera mounted on the camera holder. Pad 90 not only assists in preventing scratches on the camera, but also reduces shaking or rattling of the camera when strapped on to support arm 36. A well 92 is formed in base block 22, as shown in FIG. 1, which is designed to receive camera accessories, such as battery 94 shown in the drawings. Depending upon the dimensions of the camera holder 10, well 92 may be of a size to permit various different accessories for the particular camera utilized.

Whereas the invention has been shown and described in connection with the preferred embodiment thereof, it will be understood that many modifications, substitutions and additions may be made which are within the intended broad scope of the appended claims. There has therefore been shown and described an improved camera holder which accomplishes at least all of the above stated objects.

I claim:

1. A camera holder, comprising:
   a support member having a base portion with inward and outward sides, and forward and rearward ends;
   means on said base portion for removably connecting said base portion to a generally horizontally oriented belt;
   a support arm projecting outwardly from said base portion and having forward and rearward walls, an outward wall, and upper and lower ends;
   an attachment block removably connected to said support arm;
   means on said attachment block for removably connecting a camera thereto;
   said attachment block including forward and rearward faces, side walls and upper and lower ends;
   a bearing projecting forwardly from the forward face of said attachment block;
   said means for removably connecting a camera having a portion projecting from said bearing;
   a pocket formed in said support arm opening upwardly through the upper end thereof, for removably receiving said attachment block;
   the forward wall of said support arm having a generally vertical slot therethrough extending downwardly from the upper end, for receipt of said attachment block bearing;
   said attachment block being removably slidably mounted within said packet.

2. The camera holder of claim 1, wherein said bearing is generally V-shaped, and wherein said support arm slot has a V-shape corresponding with said bearing shape.

3. A camera holder, comprising:
   a support member having a base portion with inward and outward sides, and forward and rearward ends;
   means on said base portion for removably connecting said base portion to a generally horizontally oriented belt;
   a support arm projecting outwardly from said base portion and having forward and rearward walls, an outward wall, and upper and lower ends;
   an attachment block removably connected to said support arm; and
   means on said attachment block for removably connecting a camera thereto; including a bolt having a threaded end and a head end operably mounted through said attachment block with the threaded end projecting forwardly therefrom, said bolt operably mounted for rotation in said attachment block;
   said rearward face of said attachment block having a depression formed therein surrounding the head end of said bolt;
   said bolt having a head thereon with a predetermined thickness; and
   said depression having a depth at least as great as the bolt head thickness.

4. A camera holder, comprising:

a support member having a base portion with inward and outward sides, and forward and rearward ends;

means on said base portion for removably connecting said base portion to a generally horizontally oriented belt;

a support arm projecting outwardly from said base portion and having forward and rearward walls, an outward wall, and upper and lower ends;

an attachment block removably connected to said support arm; and means on said attachment block for removably connecting a camera thereto; including a bolt having a threaded end and a head end operably mounted through said attachment block with the threaded end projecting forwardly therefrom, said bolt operably mounted for rotation in said attachment block; and means on said attachment block for preventing pivotal movement of a camera mounted on said bolt.

5. The camera holder of claim 4, wherein said means for preventing pivotal movement includes a pin projecting forwardly from said bearing, spaced away from the said bolt threaded end.

6. A camera holder, comprising:

a support member having a base portion with inward and outward sides, and forward and rearward ends;

means on said base portion for removably connecting said base portion to a generally horizontally oriented belt;

a support arm projecting outwardly from said base portion and having forward and rearward walls, an outward wall, and upper and lower ends;

an attachment block removably connected to said support arm;

means on said attachment block for removably connecting a camera thereto;

a length-adjustable strap having a first end connected to said base portion and a free second end;

a first half of a cooperable fastener mounted on the second end of said strap;

a second half of a cooperable fastener mounted on said support arm for selective connection with said first half; and said strap having a length to extend around a camera connected to said attachment block connected to said support arm, to retain the camera in position on said support arm.

* * * * *